US005914937A

United States Patent [19]

Arnold

[11] Patent Number: 5,914,937

[45] Date of Patent: Jun. 22, 1999

[54] B-ISDN ACCESS

[75] Inventor: John S Arnold, Nether Heyford, United Kingdom

[73] Assignee: Marconi Communications Limited, Coventry, United Kingdom

[21] Appl. No.: 08/716,411

[22] PCT Filed: Mar. 28, 1995

[86] PCT No.: PCT/GB95/00696

§ 371 Date: Oct. 22, 1996

§ 102(e) Date: Oct. 22, 1996

[87] PCT Pub. No.: WO95/27384

PCT Pub. Date: Oct. 12, 1995

[30] Foreign Application Priority Data

Mar. 30, 1994 [GB] United Kingdom ................... 9406325

[51] Int. Cl.[6] ............................ H04L 12/56; H04Q 11/04

[52] U.S. Cl. .......................... 370/231; 370/236; 370/355; 370/397; 370/410; 370/467

[58] Field of Search .................................... 370/229, 230, 370/231, 235, 236, 355, 389, 395, 396, 397, 398, 399, 400, 409, 410, 465, 466, 467, 904, 905

[56] References Cited

U.S. PATENT DOCUMENTS 5,339,318 8/1994 Tanaka et al. .......................... 370/399
5,440,547 8/1995 Esaki et al. ............................ 370/395
5,493,573 2/1996 Kobayashi et al. ..................... 370/236
5,513,178 4/1996 Tanaka ................................... 370/395
5,689,499 11/1997 Hullett et al. .......................... 370/235

*Primary Examiner*—Alpus H. Hsu

[57] ABSTRACT

To increase the number of subscriber network ports which may be accessed on a Broadband Integrated Services Digital (B-ISDN) access network using Asynchronous Transfer Mode (ATM) technology where a Concentration Function is provided by statistical multiplexers, a Grooming Function by ATM switches and own-access-network connections is provided by combining "upstream" ports into the core network(s) and the "downstream" ports to subscribers into a common address group. Each subscriber port and each core network(s) access port are allocated a unique OSI Layer 2 address. The access network destination address being carried in the Virtual Path Identifier (VPI) field of each ATM cell formatted according to relevant CCITT recommendations for the User Network Interface (UNI) or the Network to Network Interface (NNI). The Virtual Channel Identifier (VCI) field of the CCITT recommendations is divided into two sub-fields which carry the OSI Layer 2 source address and a Terminal Equipment Identifier (TEI) field respectively. The TEI field is used to identify a virtual channel at the source and destination ends of a path.

7 Claims, 2 Drawing Sheets

B-ISDN ACCESS

BACKGROUND OF THE INVENTION

When the Asynchronous Transfer Mode (ATM) standards were being formulated the Virtual Path Identifier (VPI) field was intended to serve two purposes; to provide an independent non-interacting Transport Layer, and to enable an access sub-network which provides the equivalent functions to Concentrators and Grooming Switches in the Public Switched Telephone Network (PSTN).

Multiplexers in the PSTN provide a one-to-one bandwidth relationship between the subscriber line and an upstream multiplex; a multiplexer is a managed entity. Statistical Multiplexers, used in ATM and other packet-mode networks are also managed entities but they do provide statistical gain, that is the total upstream bandwidth occupied can be less than the sum of the peak bandwidth of the inputs; this is because the process of merging many sources onto one bearer results in a smoothing of the distribution and hence, the peaks are less significant. A statistical multiplexer therefore provides a similar function to a concentrator in the PSTN.

Switches which operate on the VPI field form a managed network and statistical multiplexing (concentration) and grooming are managed network functions, thus routing upstream on the VPI field in the access network is an obvious choice. The choice of VPI for routing downstream is less obvious but there are two reasons why this should be so; firstly, the same switches are likely to be used for handling routing upstream and downstream and to route on VPI upstream and VCI downstream would affect the complexity, and hence the cost, of the switches. Secondly the downstream path would, in many cases, make connection to the equivalent of an S-bus serving several terminals, requiring many virtual channels which can also be contained in one virtual path.

Another feature often specified for PSTN multiplexers and concentrators is own-unit switching capability, usually in order to provide a limited service if the upstream link(s) fail. In the above scenario for Broadband-Integrated Services Digital Network (B-ISDN) access, since there must be VPI addresses for all the ports in the downstream direction, and since switches rather than simple statistical multiplexers are used in the access network in order to provide grooming, all that is necessary to provide an own-unit switching capability is to place the "upstream" (grooming) ports and the "downstream" (subscriber) ports in a common address group.

SUMMARY OF THE INVENTION

According to the present invention there is provided a Broadband-Integrated Services Digital (B-ISDN) access network using Asynchronous Transfer Mode (ATM) technology where a Concentration Function is provided by statistical multiplexers, a Grooming Function by ATM switches and own-access-network connections is provided by combining "upstream" ports into the core network(s) and the "downstream" ports to subscribers into a common address group and where each subscriber port and each core network(s) access port is allocated a unique OSI Layer 2 address and where the access network destination address is carried in the Virtual Path Identifier (VPI) field of each ATM cell formatted according to relevant CCITT recommendations for the User Network Interface (UNI) or the Network to Network Interface (NNI) and where the Virtual Channel Identifier (VCI) field of said recommendations is divided into two sub-fields which carry the OSI Layer 2 source address and a Terminal Equipment Identifier (TEI) field respectively, said TEI field being used to identify a virtual channel at the source and destination ends of a path.

There is further provided a B-ISDN network wherein the UNI format, characterised by an 8-bit VPI field and 4 bits reserved for an independent Generic Flow Control (GFC) channel, is used throughout the access network and the maximum number of network port addresses available is 256, where a network port may be serving a subscriber or an access port to a core network, and where the application of a flow-control protocol is enabled over network port access links and inter-switch or statistical multiplexer links.

Also there is provided a B-ISDN network where the UNI format is used on network ports and the NNI format, characterised by a 12-bit VPI field, is used on inter-switch or statistical multiplexer links in the remainder of the access network and the maximum number of network port addresses available is 4,096 and where the application of a flow-control protocol is enabled over network port access links.

There is further provided a B-ISDN network comprising a plurality of sub-networks, each sub-network having a plurality of User Network Ports wherein the Destination and Source addresses in a cell-header carried by a cell switched by the network are each divided into a Port Address part and a Sub-network Address part and wherein the Source Sub-network part is implicit whilst the cell remains in the Source Sub-network and similarly the Destination Sub-network part is implicit from when the cell arrives in the Destination Sub-network, wherein the Source and the Destination Sub-networks are linked via a cross-connect switching device wherein the address formats are changed.

BRIEF DESCRIPTION OF THE DRAWINGS

The present invention will now be described by way of example, with reference to the accompanying drawings, in which.

DETAILED DESCRIPTION OF THE PREFERRED EMBODIMENTS

Scenario 1

Figure 1:
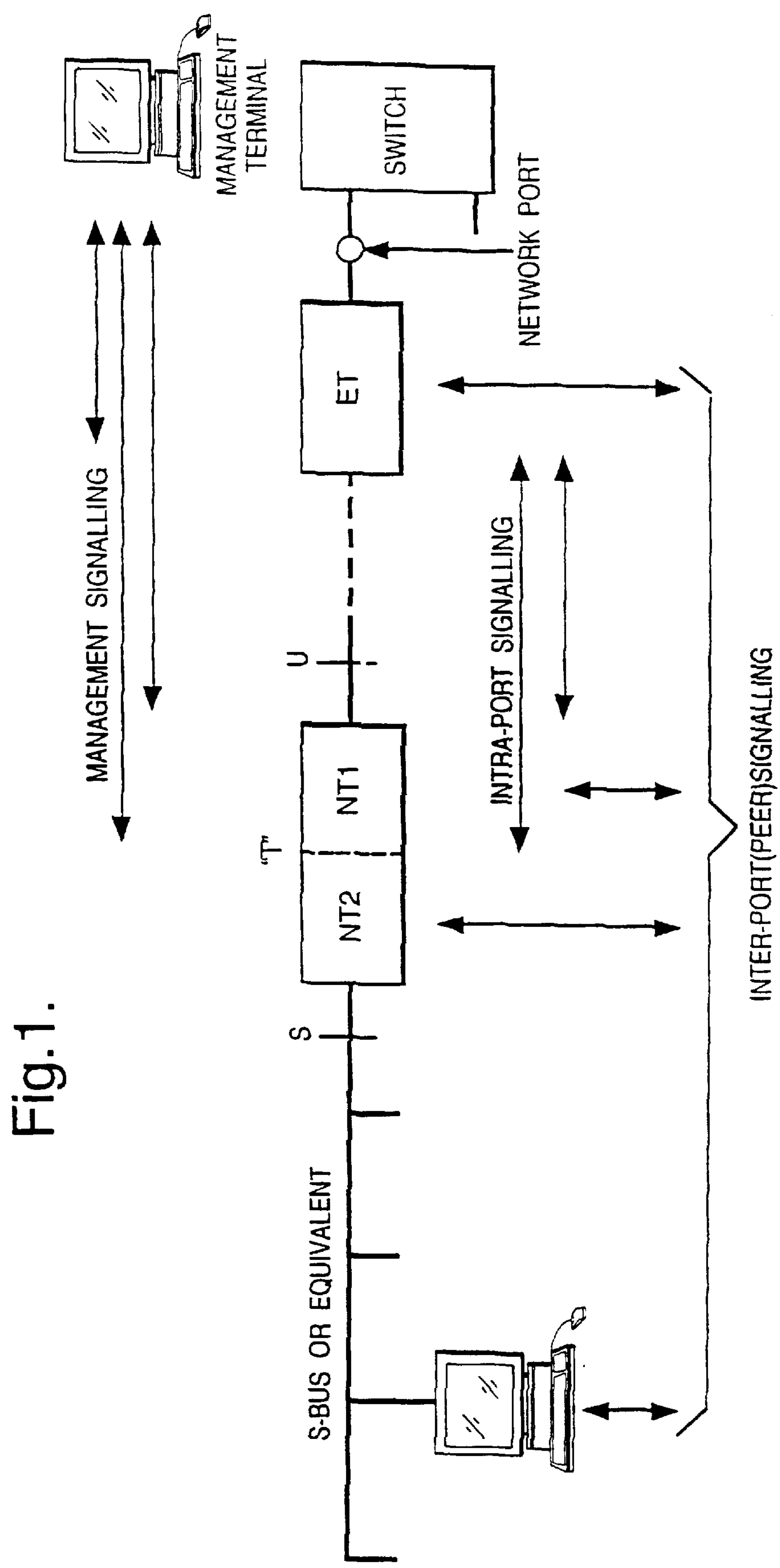
FIG. 1 is a diagram showing a B-ISDN Line Reference Model.

For this scenario the (UNI) format of the ATM cell header is used throughout the access network. The VPI field is 8-bits, providing 256 addresses some of which will be used for grooming ports and a few are reserved for global and local network functions thus, such a network might serve up to about 200 subscriber network ports.

16-bit Virtual Channel Identifier (VCI) field is divided into two 8-bit sub-fields. The Most Significant (MS) 8-bits carry the access network source address, equivalent to a Message Identifier (MID) field; the Least Significant (LS) 8-bits identify a virtual channel on the subscriber access. These two fields correspond approximately to the SAPI and TEI fields respectively in the Narrowband-Integrated Services Digital Network (N-ISDN) standard. Flow-control may be used on internal inter-switch links (back-pressure).

Scenario 2

The Network Node Interface (NNI) format is used in the access network and the UNI format on the link to the subscriber terminal; within the access network the 12-bit VPI field provides for up to 4,096 addresses. The VPI field is divided into a 12-bit source address field and a 4-bit "TEI" field. A 4-bit TEI field may be considered inadequate, at least for access to the public network; thus the grooming ports would be allocated (say) 16 addresses each, expanding the "TEI" field for access to/from the rest of the public network to an effective 8-bits (the N-ISDN TEI field is 7-bits). For intra-access network connections there would still only be 4-bits but, if taken with the source address field (ie the complete 16-bit VCI field), up to 16 virtual channels between each pair of subscriber network ports are available.

The source network port address need not be carried on the subscriber (or grooming port) access link in the upstream direction but is added at the Exchange Termination (ET on the access switch port); similarly, the destination network port address is redundant in the downstream direction. By this means the NNI format is transformed to the UNI format on the access link.

Scenario 3

For this scenario the principles described in patent application Ser. No. GB 2274227 imported herein by reference would be used, providing for an access network with up to 32,678 addresses.

The access network is hierarchically structured, composed of up to 128 sub-networks each serving up to 256 network ports. The sub-networks are interconnected by cross-connect switches with special features.

This embodiment offers the potential for further expansion of access networks in the future should it be needed.

The access networks of the embodiments described may be distributed over several sites, linked by Virtual Paths provided by the standard ATM Transport Layer infrastructure (ETSI draft TCR-TR 014 of Jun. 16, 1993). The infrastructure must provide routing on the 12-bit VPI field of the NNI format and carry the VCI field transparently. Provision for setting the "congested" state into the Payload Type field of cells where the switch queue size suggests the approach of congestion, is desirable.

ATM, in its early days, is likely to be used principally by business customers to form private networks. The access network structures described, with the "own-unit" switching capability used to carry all internal traffic, is close to the ideal private network architecture; obviously, therefore, provision for Virtual Private Networks by a public operator using this architecture in the access network presents no new problems. This service will be particularly advantageous, to the customer, for multi-site networks and hence the ability to distribute the "access" network (see above) will be of prime importance.

Signalling access to all active equipment nodes is, of course, essential to manage the network. Major items of equipment, such as switches, may be allocated reserved addresses but individual signalling access must also be provided to the nodes on a B-ISDN subscriber line which include the Exchange Terminator (ET), the Network Terminator 1 (NT1) and the Network Terminator 2 (NT2) shown in FIG. 1.

The NT1 may be considered as the ATM sub-layer of an adaption unit; for access to packet-mode networks the NT2 would provide the SAR and Convergence sub-layers of an AAL5 adaption unit. For the S-bus (or equivalent) the NT2 would provide VCI handling, contention resolution and flow-control.

Three kinds of signalling are shown in this figure; intra-port is used to communicate signalling messages up/down the customer access connection, management signalling is used by the manager (which has access via any convenient port in the access network) to maintain parameters and tables, inter-port is used to provide user-to-user signalling for a variety of purposes including congestion control.

Each type of access node is allocated a reserved address value; four values are needed in the case above if the terminal is included. The reserved type-code is carried in the source address field (MS×bits of VCI field of signalling cells) and the real source address is displaced to the payload, which also carries the signalling message. The destination address is unaffected and is used to route to the destination network port in the normal way.

Each access node is required to examine the source address field of passing cells for the presence of its type code; if recognised the cell is trapped. Cells are examined in both directions to provide a comprehensive up/down intra-port signalling capability. Messages originated by a node carrying its own type-code will, of course, not be recognised on the source network port but will instead be transported across the network to its peer node on the destination network port.

The access network is a managed network with routing on the VPI field and no direct knowledge of calls which are associated with the VCI field. Traffic control is therefore not possible, but traffic management is an essential requirement.

Each individual switch in a network will interpret the Destination Address to a switch output port, thus successive cells between the same source and destination will follow the same path; this ensures that sequence integrity is retained. The Interpreter table at each switch input port is set up and maintained by a Resource Manager, which is a set of management tools run as an application on a PC on any network port. In order to determine optimum routings, the Resource Manager must have access to information on the traffic carried by each core network bearer. The queue size indication used to set the "congestion" indication into the cell Payload Type field is not a good indicator for this purpose since the relationship between traffic and queue size is exponential and provides little useful guidance under normal operating conditions when bearer loading should be relatively light. Instead, the running average occupancy of each switch output bearer is monitored and held in the switch control memory where it is available for polling by the Resource Manager; for this purpose a signalling address is allocated to each switch.

A conventional wisdom in traditional telecommunications systems is that bandwidth is an expensive commodity which must be conserved; a broadband system will, however, use optical fibre interconnection at least in the core network and, for fibre technology, bandwidth is a relatively cheap commodity (and reducing as the technology matures). Thus in order to provide the network with resilience to short-term traffic peaks, the target load under normal operating conditions should be in the region of 40–60%. An average load of 40–60% will correspond to a per-channel summated peak load in the region of 70–100% for typical mixes of services carried; statistical smoothing will ensure a low cell-loss rate despite this high loading if the peak rates of individual channel rates are restricted to about ⅛ of bearer rate. The Resource Manager software suite includes tools which will enable high occupancy bearers to be easily identified and paths to be re-routed and will also provide storage for approved changes which will be implemented during low traffic periods, say at night, thus minimising the effect from the temporary loss of cells and/or loss of sequence integrity which may occur when a path is re-routed.

An ATM network which is reliant on traffic management to provide reliable service will also need congestion/flow control to ensure that short-term conditions do not damage the quality-of-service and this would be provided by two mechanisms, one using the "congested" indication in the cell Payload Type field, the other using the Generic Flow Control (GFC) "channel" on the access line to control data flow in the user equipment.

Figure 2:
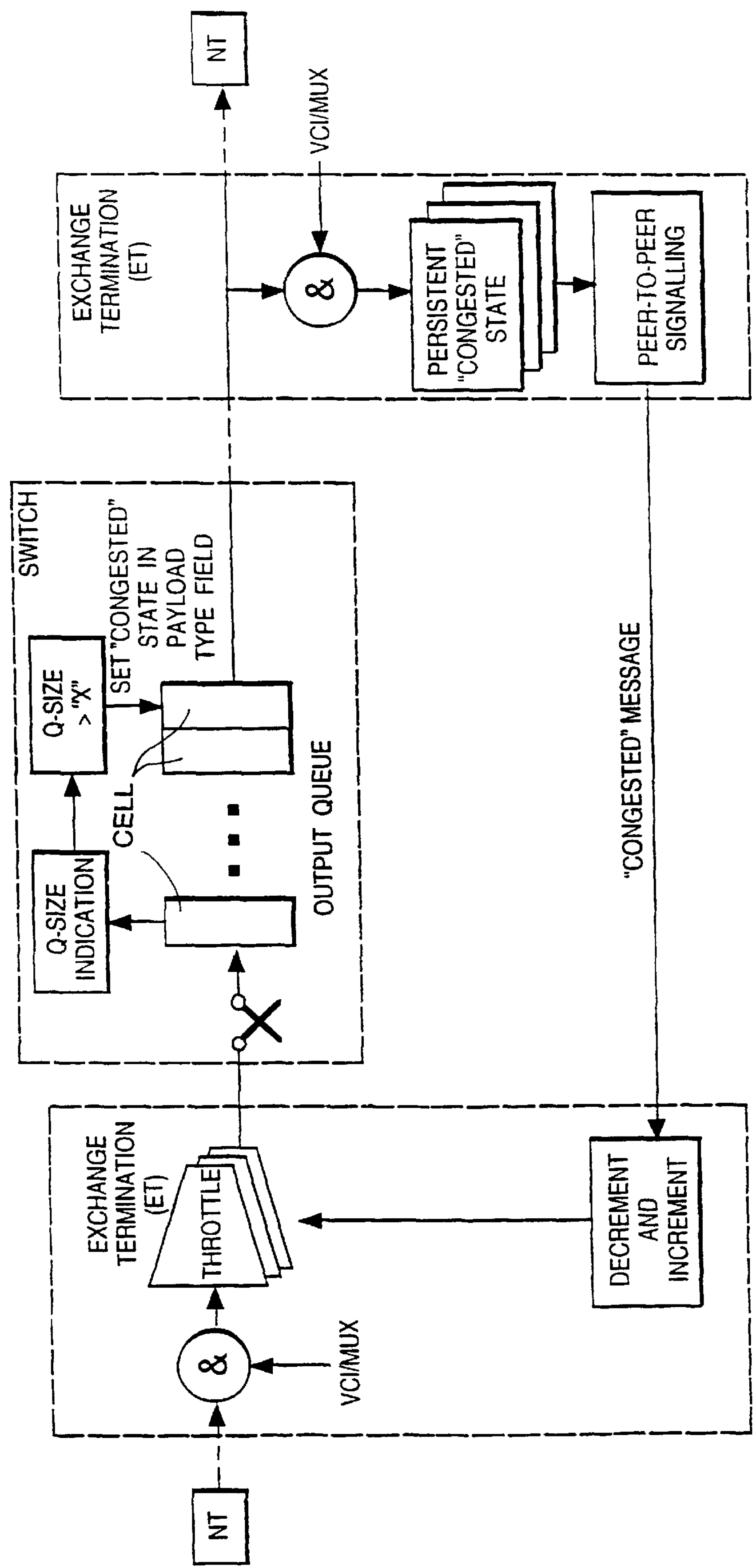
FIG. 2 is a diagram illustration a form of self-regulating congestion avoidance.

Use of the "congested" indication is illustrated in FIG. 2.

The values of the parameters used in the switches and persistence check are set so that the possibility of congestion can be predicted so that action may be taken before congestion actually occurs.

The "throttle" shown on the left of the figure is actually provided by the flow-control mechanism provided over the GFC channel. The GFC protocol has not yet been standarised; ideally this protocol should be linked to the contention resolution mechanism of the S-bus. An objective should be that the peak channel rate (controlled range of say, 1/64 to 1/8 of bearer rate with a default value of 1/16) should be mandatory, the user being supplied with adequate and timely information to achieve the target with minimum service disruption.

For intra-access network connections, routed on the destination address carried in the VPI field as a virtual-path, there are no "calls" in the accepted sence thus, for such connections, a flat-rate service charge would be appropriate.

Connections routed to ports into the core of the public ATM switching network, and noting that all cells in the access network carry the Layer 2 source address in the upper part of the VCI field, would be defined as "calls" delineated by signalling messages and subject to the accepted B-ISDN "service profile" bandwidth and service description and related call charges.

Calls would be established using the access network peer-to-peer signalling feature described earlier between user and a Connection-Mode Server at the interface between the access network and the core network, providing the equivalent to D-channel signalling in an N-ISDN network.

I claim:

1. In a Broadband Integrated Services Digital (B-ISDN) access network using Asynchronous Transfer Mode (ATM) cells and including at least one core network, upstream and downstream ports for subscribers, statistical multiplexers for providing a Concentration Function, and ATM switches for providing a Grooming Function, said B-ISDN access network comprising:

own-access-network connections being provided by the upstream ports being combined into said at least one core network and by the downstream ports to the subscribers into a common address group;

each downstream port to a subscriber and each upstream port to said at least one core network being allocated a unique Open Systems Interconnection (OSI) Layer 2 address;

an access network destination address being carried in a Virtual Path Identifier (VPI) field of each ATM cell formatted with an 8-bit VPI field for a User Network Interface (UNI) and with a 12-bit VPI field for a Network to Network Interface (NNI); and a Virtual Channel Identifier (VCI) field being divided into two sub-fields for carrying an OSI Layer 2 source address and a Terminal Equipment Identifier (TEI) field respectively, said TEI field being used to identify a virtual channel at source and destination ends of a path.

2. The B-ISDN access network as claimed in claim 1, wherein the UNI has a format, characterized by the 8-bit VPI field and by 4-bits reserved for an independent Generic Flow Control (GFC) channel, which is used throughout the access network, wherein the maximum number of network port addresses available is 256, wherein a network port serves as one of the upstream and downstream ports to said at least one core network, and wherein a flow-control protocol is enabled over network port access links and interswitch or statistical multiplexer links.

3. The B-ISDN access network as claimed in claim 1, wherein the UNI has a format which is used on network ports, which is based on an NNI format, which is characterized by a 12-bit VPI field, and which is used on interswitch or statistical multiplexer links in the remainder of the access network, wherein the maximum number of network port addresses available is 4,096, and wherein a flow-control protocol is enabled over network port access links.

4. The B-ISDN access network as claimed in claim 1, wherein the access network further comprises a plurality of sub-networks, each sub-network having a plurality of User Network Ports, wherein Destination and Source addresses in a cell-header carried by a cell switched by the access network are each divided into a Port Address part and a Sub-network Address part, and wherein the Source Sub-network Address part is implicit while the cell remains in the Source Sub-network, and wherein the Destination Sub-network Address part is implicit from when the cell arrives in the Destination Sub-network, and wherein the Source and the Destination Sub-networks are linked via a cross-connect switching device in which the address formats are changed.

5. The B-ISDN access network as claimed in claim 1, wherein the cell-header includes a format indicator to indicate the use of a Source or Destination format.

6. The B-ISDN access network as claimed in claim 5, wherein the cell-header includes an alternative route bit to provide alternative paths for the cell to a group of User Network Ports (UNPs).

7. The B-ISDN access network as claimed in claim 4, wherein the access network includes a public network, the UNI having a format which includes a space occupied by a Generic Flow Control Field.

* * * * *